No. 739,631. PATENTED SEPT. 22, 1903.
E. C. AHLHEIM.
BEARING.
APPLICATION FILED FEB. 4, 1903.
NO MODEL. 2 SHEETS—SHEET 1.

Witnesses:
F. L. Ourand
Frank G. Radelfinger

Inventor:
Edward C. Ahlheim
by Laws Ragger & Co.,
Attorneys

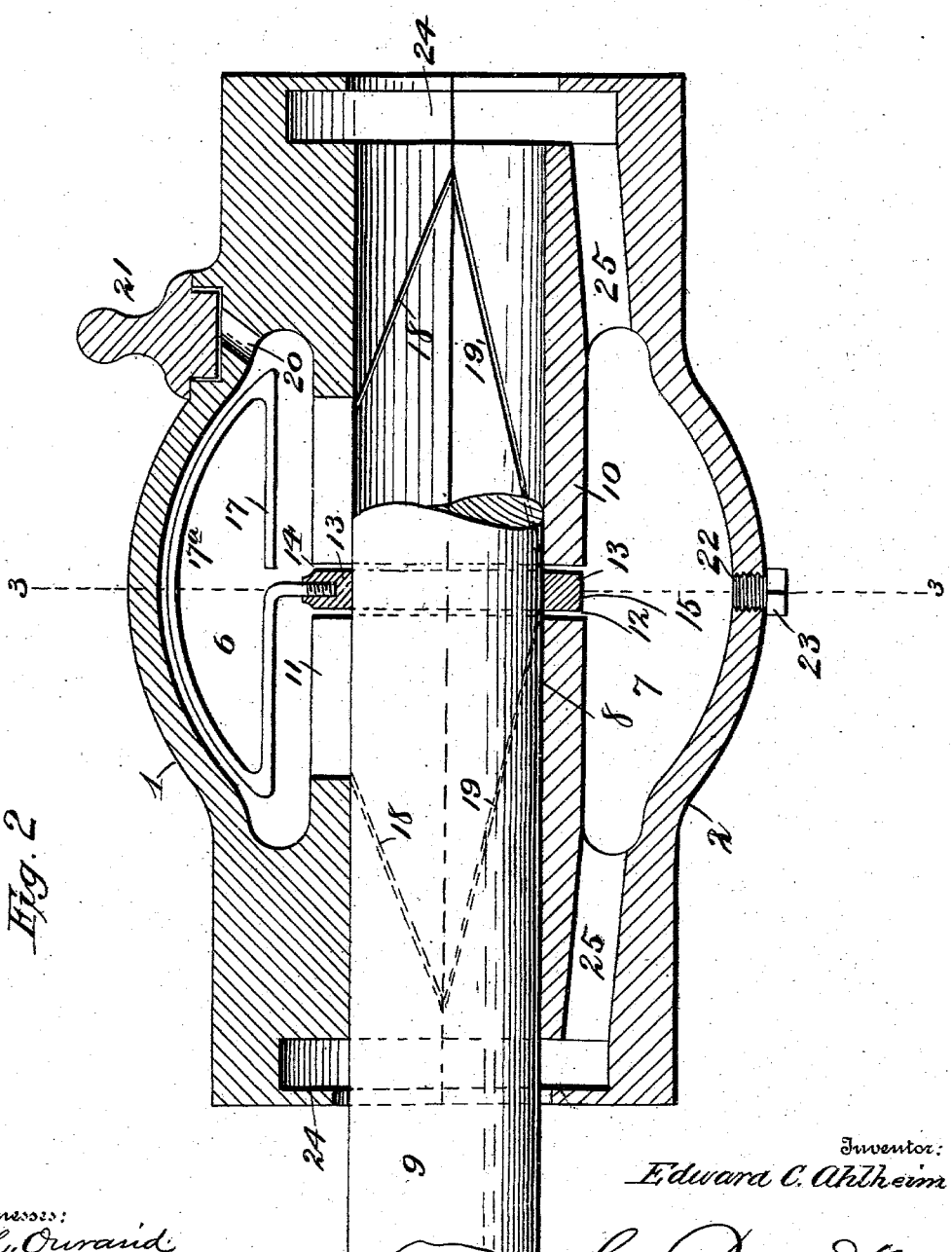

No. 739,631. Patented September 22, 1903.

UNITED STATES PATENT OFFICE.

EDWARD C. AHLHEIM, OF MANSFIELD, OHIO.

BEARING.

SPECIFICATION forming part of Letters Patent No. 739,631, dated September 22, 1903.

Application filed February 4, 1903. Serial No. 141,876. (No model.)

*To all whom it may concern:*

Be it known that I, EDWARD C. AHLHEIM, a citizen of the United States, residing at Mansfield, in the county of Richland and State of Ohio, have invented new and useful Improvements in Bearings, of which the following is a specification.

My invention relates to improvements in bearings; and the object of the same is, first, to provide a bearing for holding enough oil to last an extended period; second, to provide an agitator to keep the oil from clogging, thereby preventing hot boxes, and to dip up the oil and apply it to the shaft, and, third, to prevent wasting the oil.

The simple and novel construction employed by me in carrying out my invention is fully described and claimed in this specification and illustrated in the accompanying drawings, forming a part thereof, in which—

Figure 1:
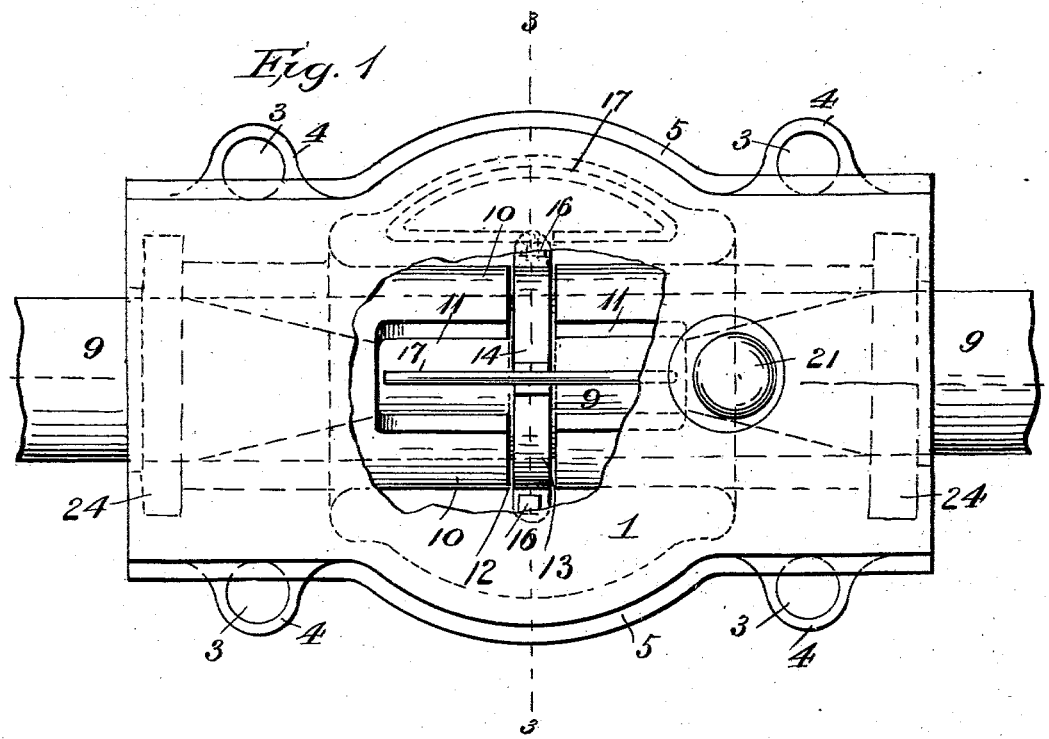
Figure 3:
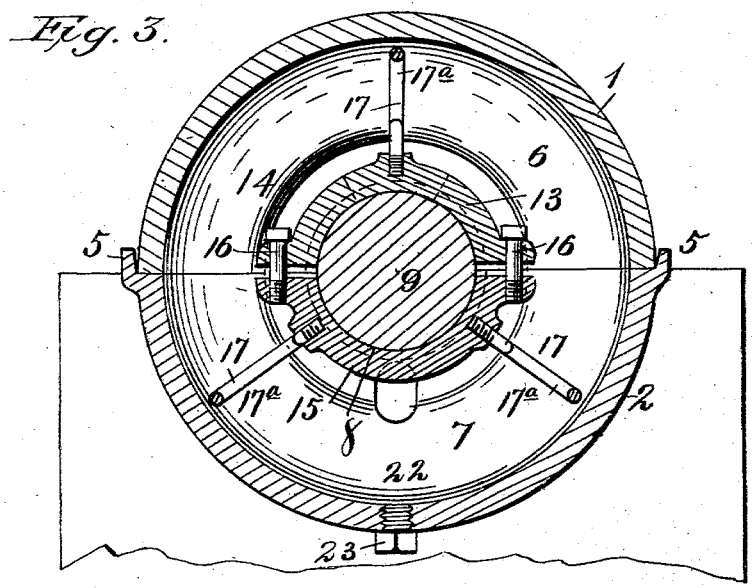

Figure 1 is a plan view of the box, partially broken away. Fig. 2 is a vertical longitudinal section through my bearing, with the shaft broken away on one side.

Like numerals of reference designate like parts in the different views of the drawings.

The body of my bearing consists of a casing or box constructed in two sections—an upper section 1 and a lower section 2—which are clamped together by bolts 3, fitting apertures in ears 4, formed on these sections. An upturned flange 5 is formed on the lower section 2 and extends up beyond the line of junction of the two sections to prevent leakage.

An oil-chamber 6 is formed in the upper section 1, which, in combination with an oil-chamber 7, formed in the lower half 2, extend around a longitudinal bore 8 in the box, through which a shaft 9 passes. The chambers 6 and 7 are separated from the bore 8 by a partition 10, which is traversed by a longitudinally-extending slot 11 in the upper half 1, which slot forms a passage for the oil, and a transverse circular slot 12, which surrounds the bore 8 and severs the partition 10 to accommodate a collar 13. The collar 13 is made in two sections 14 and 15, which embrace the shaft 9 and are firmly clamped thereon by bolts 16, passing through apertured ears formed on the collar. Radially-extending arms 17 are carried by the collar 13 and have elongated eyes $17^a$ formed on their outer ends, which eyes conform to the contour of the outer walls of the chambers 7, which they just escape, to adapt the arms to dip up the oil in the chamber 7 and carry it up and drop it through the slot 11 onto the shaft 9. The eyes $17^a$ are not made closed, but have a gap or break formed therein to enable the oil to drip off and not be held by the eye.

To enable the oil to reach every portion of the bearing, diagonal grooves 18 are cut in the walls of the bore and diverge from the corners of the slot 11 and extend to the edge of the upper section 1 of the box, where they meet grooves 19, cut in the lower section 2, and extend to the bottom thereof. A passage 20, normally closed by a stopper 21, permits the introduction of oil into the chamber 6, and an aperture 22, normally closed by a threaded plug 23, permits the draining of the lower chamber 7. To catch the leakage from the ends of the bearing, chambers 24 are provided in the box adjacent to the ends and surround the bore 8, with which they communicate directly and also communicate with the oil-chamber 7 via ducts 25, formed in the lower section 2, which ducts serve to conduct the oil back to the chamber 7.

In practice the chamber 7 is filled or partially filled with oil through the passage 20. The eyes $17^a$ on the arms 17 dip up the oil in the chamber 7 and carry it up, when it will drip off as the arms pass around and fall into the slot 11, from whence it will be able to reach all points of the bearing through the grooves 18 and 19.

I do not wish to be limited as to details of construction, as these may be modified in many particulars without departing from the spirit of my invention.

Having thus described my invention, what I claim as new, and desire to secure by Letters Patent, is—

In a bearing, the combination of a box bored to accommodate a shaft and having an oil-chamber therein which surrounds said bore and communicates therewith by means of a longitudinal slot formed in the upper half of the box and a transverse slot, an arm carried by said shaft and traveling in said transverse slot, said arm having an elongated eye formed on the outer end thereof and having a break or gap in the inner side thereof, said eye being designed to dip into the oil, and carrying it up to drip off at said gap into said slot, substantially as described.

In testimony whereof I have hereunto set my hand in presence of two subscribing witnesses.

EDWARD C. AHLHEIM.

Witnesses:
 Mrs. C. BERNO,
 CHAS. F. BERNO.